United States Patent
Kalhan

(10) Patent No.: US 10,098,137 B2
(45) Date of Patent: Oct. 9, 2018

(54) UNLICENSED FREQUENCY BAND WITH LICENSED FREQUENCY BAND TIMING

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/715,514

(22) Filed: Sep. 26, 2017

(65) Prior Publication Data

US 2018/0027579 A1 Jan. 25, 2018

Related U.S. Application Data

(63) Continuation of application No. 15/311,735, filed as application No. PCT/US2015/032257 on May 22, 2015, now Pat. No. 9,801,198.

(Continued)

(51) Int. Cl.
*H04W 72/12* (2009.01)
*H04W 76/14* (2018.01)
(Continued)

(52) U.S. Cl.
CPC ...... *H04W 72/1215* (2013.01); *H04B 7/2615* (2013.01); *H04L 5/001* (2013.01); *H04L 27/0006* (2013.01); *H04W 4/70* (2018.02); *H04W 16/14* (2013.01); *H04W 24/08* (2013.01); *H04W 24/10* (2013.01); *H04W 72/02* (2013.01); *H04W 72/042* (2013.01); *H04W 72/0413* (2013.01); *H04W 72/0446* (2013.01); *H04W 72/0453* (2013.01); *H04W 72/082* (2013.01);

(Continued)

(58) Field of Classification Search
CPC .......................... H04W 72/1215; H04W 16/14
USPC ....... 455/421, 422.1, 424, 435.2, 41.1, 41.2, 455/454, 434, 525
See application file for complete search history.

(56) References Cited

U.S. PATENT DOCUMENTS

2004/0203815 A1* 10/2004 Shoemake ............ H04W 72/02 455/450
2005/0259613 A1 11/2005 Garudadri et al.
(Continued)

FOREIGN PATENT DOCUMENTS

WO WO 2013-155672 10/2013
WO WO 2013-179095 12/2013

OTHER PUBLICATIONS

LG Electronics; "Downlink control signaling enhancements in Rel-11," R1-113266; Oct. 4, 2011; 3GPP TSG-RAN WG1, Meeting #66bis; Zhuhai, CN.
(Continued)

*Primary Examiner* — Cong Tran

(57) ABSTRACT

The timing used by communication equipment in a licensed frequency band by is used by the communication equipment for communication in an unlicensed frequency band. Time divisions, such as frames, subframes, timeslots, and symbol times, defined for use in the licensed frequency band are used by the communication equipment to communicate in the unlicensed frequency band. Before a transmitting device transmits within the unlicensed frequency band, the unlicensed frequency band is monitored for radio frequency energy to determine if the spectrum is currently being used. If no energy is detected, or the level is below a threshold, it is determined that the unlicensed band can be used by the transmitter.

15 Claims, 14 Drawing Sheets

Related U.S. Application Data

(60) Provisional application No. 62/002,037, filed on May 22, 2014, provisional application No. 62/002,041, filed on May 22, 2014.

(51) Int. Cl.

| | | |
|---|---|---|
| *H04W 4/70* | (2018.01) | |
| *H04W 16/14* | (2009.01) | |
| *H04W 24/10* | (2009.01) | |
| *H04W 72/04* | (2009.01) | |
| *H04W 72/08* | (2009.01) | |
| *H04W 24/08* | (2009.01) | |
| *H04W 72/02* | (2009.01) | |
| *H04L 27/00* | (2006.01) | |
| *H04W 74/08* | (2009.01) | |
| *H04W 84/12* | (2009.01) | |
| *H04B 7/26* | (2006.01) | |
| *H04W 88/06* | (2009.01) | |
| *H04W 88/08* | (2009.01) | |
| *H04L 5/00* | (2006.01) | |

(52) U.S. Cl.
CPC ... *H04W 72/1284* (2013.01); *H04W 74/0808* (2013.01); *H04W 76/14* (2018.02); *H04W 84/12* (2013.01); *H04L 5/0048* (2013.01); *H04W 74/0866* (2013.01); *H04W 88/06* (2013.01); *H04W 88/08* (2013.01)

(56) References Cited

U.S. PATENT DOCUMENTS

| | | | |
|---|---|---|---|
| 2008/0298450 | A1 | 12/2008 | Zhang et al. |
| 2010/0029216 | A1 | 2/2010 | Jovicic et al. |
| 2010/0246506 | A1 | 9/2010 | Krishnaswamy et al. |
| 2011/0286343 | A1* | 11/2011 | Powell ............ H04W 76/02 370/252 |
| 2011/0312331 | A1 | 12/2011 | Hakola et al. |
| 2012/0020258 | A1 | 1/2012 | Linsky et al. |
| 2012/0307869 | A1 | 12/2012 | Charbit et al. |
| 2013/0051383 | A1 | 2/2013 | Hakola et al. |
| 2013/0064155 | A1* | 3/2013 | Sohrabi ............ H04W 72/1242 370/311 |
| 2013/0083783 | A1 | 4/2013 | Gupta et al. |
| 2013/0143502 | A1 | 6/2013 | Kazmi et al. |
| 2013/0155991 | A1 | 6/2013 | Kazmi et al. |
| 2014/0036818 | A1 | 2/2014 | Koskela et al. |
| 2014/0036853 | A1 | 2/2014 | Kim et al. |
| 2014/0092865 | A1 | 4/2014 | Heo et al. |
| 2014/0112289 | A1 | 4/2014 | Kim et al. |
| 2014/0206279 | A1 | 7/2014 | Immendorf et al. |
| 2014/0219205 | A1* | 8/2014 | Aso ............ H04W 12/08 370/329 |
| 2014/0378157 | A1* | 12/2014 | Wei ............ H04W 16/14 455/454 |
| 2016/0301504 | A1 | 10/2016 | Toskala et al. |

OTHER PUBLICATIONS

Fujitsu; "On scenarios for cross-subframe/multi-subframe scheduling," R1-131952; May 11, 2013; 3GPP TSG-RAN WG1 Meeting #73; Fukuoka, JP.

Cisco; "On LTE in Unlicensed Spectrum," RP-131749; Nov. 26, 2013; 3GPP TSG-RAM Meeting #62; Busan, KR.

Huawei, Ericsson, QUALCOMM, CMCC, Verizon; "Summary of a workshop on LTE in Unlicensed Spectrum," RP-140060; Feb. 25, 2014; 3GPP TSG RAN Meeting #63; Fukuoka, JP.

Huawei, CMCC, Ericsson, QUALCOMM, Verizon; "Motivation of the New Si Proposal: Study on Licensed-Assisted Access using LTE," RP-140214; Feb. 25, 2014; 3GPP TSG-RAN Meeting #63; Fukuoka, JP.

Ericsson, QUALCOMM, Huawei; "Study on Licensed-Assisted Access Using LTE," RP-140260; Feb. 25, 2014; 3GPP TSG RAN Meeting #63; Fukuoka, JP.

Feilu Lu, Elza Erkip, Mihaela C Beluri, Rui Yang and Erdem Bala; "Dual-Band Femtocell Traffic Balancing Over Licensed and Unlicensed Bands"; International Workshop on Small Cell Wireless Networks 2012 (ICC 2012), IEEE; Jun. 12, 2012; Ottawa, CA.

Samsung; "Physical Channel Design for Scheduling Assignment"; R1-141851; 3GPP TSG RAN WG1 Meeting #76bis; Mar. 31-Apr. 4, 2014; Shenzhen, China.

Kyocera, "Design Details of Scheduling Assignments"; R1-141459; 3GPP TSG RAN WG1 Meeting #76bis; Mar. 31-Apr. 4, 2014; Shenzhen, China.

* cited by examiner

UNLICENSED FREQUENCY BAND WITH LICENSED FREQUENCY BAND TIMING

CLAIM OF PRIORITY

The present application is a continuation of and claims priority to U.S. application Ser. No. 15/311,735, entitled "UNLICENSED FREQUENCY BAND WITH LICENSED FREQUENCY BAND TIMING" and filed on Nov. 16, 2016, which is a national stage application of PCT/US2015/032257, entitled "UNLICENSED FREQUENCY BAND WITH LICENSED FREQUENCY BAND TIMING" and filed on May 22, 2015, which claims priority to Provisional Application No. 62/002,037, entitled "METHODS OF RESERVING RESOURCES ON UNLICENSED BANDS", filed May 22, 2014, and to Provisional Application No. 62/002,041, entitled "METHODS OF COORDINATING LTE TRANSMISSIONS ON UNLICENSED BANDS", filed May 22, 2014, all assigned to the assignee hereof and hereby expressly incorporated by reference.

FIELD

This invention generally relates to wireless communications and more particularly to applying a timing of a licensed frequency band for communication in an unlicensed frequency band.

BACKGROUND

Many communications have timing schemes or timing structures for managing communications between devices. Time can be defined in any number of units and subunits where the communication equipment applies the timing to transmission and reception. For example, some systems divide time into at least frames, subframes, timeslots, and symbol times.

The frequency spectrum used by a particular communication may be licensed or unlicensed. Licensed frequency spectrum (frequency band) is licensed to a system operator by a government agency, such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of unlicensed frequency spectrum includes frequency bands used for Institute of Electrical and Electronics Engineers (IEEE) 802.11 communication.

SUMMARY

The timing used by communication equipment in a licensed frequency band is used by the communication equipment for communication in an unlicensed frequency band. Time divisions, such as frames, subframes, timeslots, and symbol times, defined for use in the licensed frequency band are used by the communication equipment to communicate in the unlicensed frequency band. Before a transmitting device transmits within the unlicensed frequency band, the unlicensed frequency band is monitored for radio frequency energy to determine if the spectrum is currently being used. If no energy is detected, or the level is below a threshold, it is determined that the unlicensed band can be used by the transmitter. In some examples discussed below, the unlicensed band is monitored in a subframe previous to the subframe where the transmitting device will transmit over the unlicensed frequency band. The unlicensed frequency band can be monitored by the transmitting device or by another device depending on the particular implementation.

DETAILED DESCRIPTION

The timing and the timing structure used for communication by communication equipment in a licensed frequency band are used by the communication equipment to communicate using the unlicensed frequency spectrum. As discussed herein, "timing structure" and "timing scheme" refer to the divisions and subdivisions in time for managing communication. The timing structure in the examples below includes dividing time into at least frames, subframes and timeslots and symbol times. As discussed herein "timing" refers to points in time and periods of time. More specifically, using the same timing requires that the boundaries of the smallest division of time in the timing structure be aligned. By applying the timing of the licensed system to the unlicensed frequency band, therefore, communication events are aligned in time. Although the timing structure used in the unlicensed frequency band can be applied such that it is aligned with the timing structure in the licensed frequency, the timing of the licensed system can be applied to communication in the unlicensed frequency band without aligning the timing structure. For example, the timing structure used in the unlicensed frequency band may be offset from the timing structure in the licensed frequency band by some multiple of symbol times. Since the timing used in the licensed frequency band is applied to the unlicensed frequency band, however, the boundaries of the symbol times in the unlicensed frequency band are aligned with the symbol time boundaries in the licensed frequency band. Before a transmitting device transmits within the unlicensed frequency band, the unlicensed frequency band is monitored for radio frequency energy to determine if the spectrum is currently being used. If no energy is detected, or the level is below a threshold, it is determined that the unlicensed band can be used by the transmitter. In some examples discussed below, the unlicensed band is monitored in a subframe previous to the subframe where the transmitting device will transmit over the unlicensed frequency band. In some examples, the transmitting device is an eNB transmitting to a user equipment (UE) device where, in one situation, the eNB monitors the unlicensed frequency band and, in another situation, the UE device monitors the unlicensed frequency band. In other examples, the transmitting device is a UE device transmitting to an eNB where, in one situation, the eNB monitors the unlicensed frequency band and, in another situation, the UE device monitors the unlicensed frequency band. In still other examples, the transmitting device is a UE device transmitting to another UE device where, in one situation, the eNB monitors the unlicensed frequency band and, in another situation, one of the UE devices monitors the unlicensed frequency band.

Figure 1:
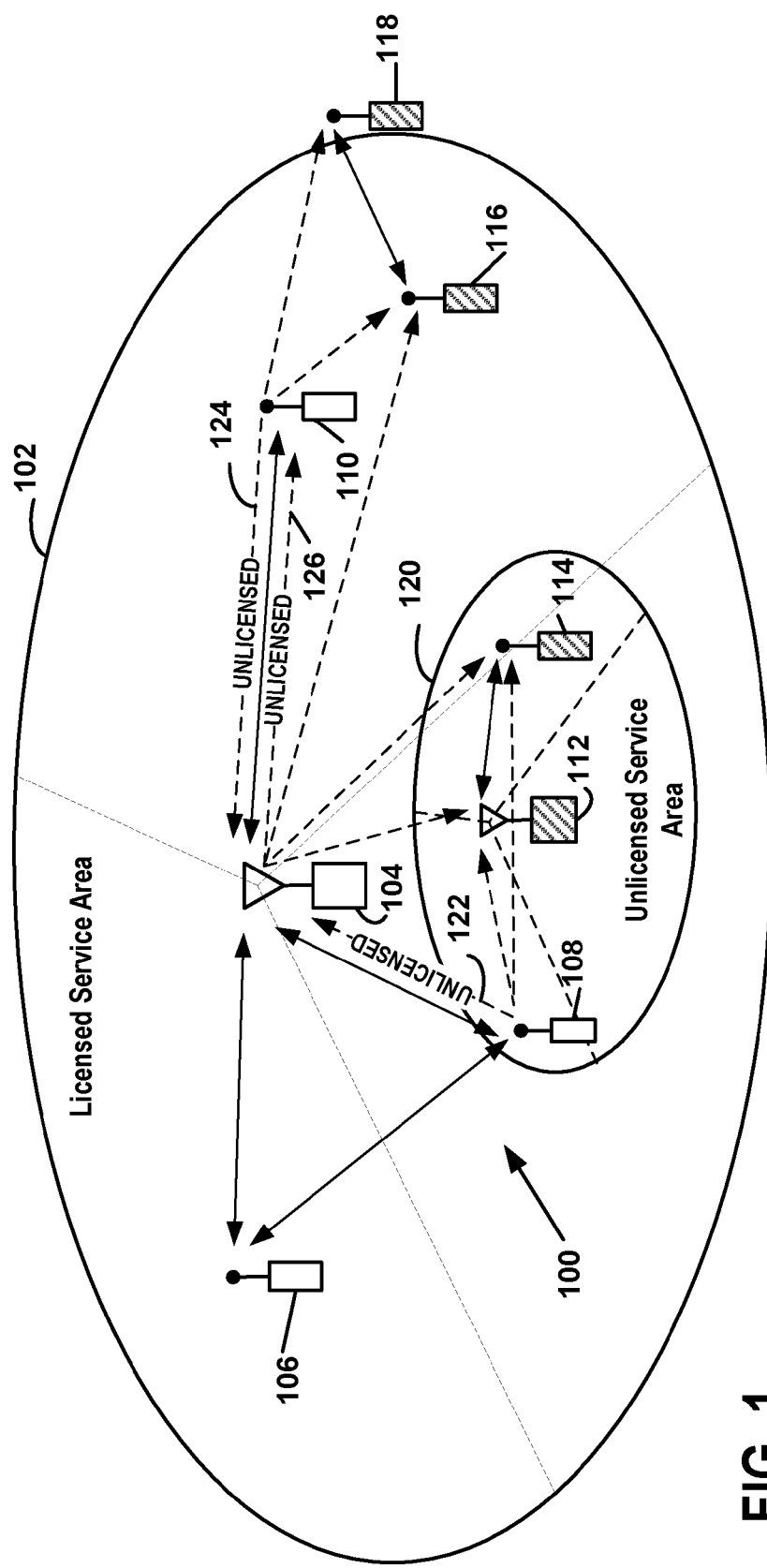
FIG. 1 is a block diagram of a licensed communication system having a licensed service area where communication equipment communicates using an unlicensed frequency band.

FIG. 1 is a block diagram of a licensed communication system 100 having a licensed service area 102 where communication equipment 104, 106, 108, 110 communicates using an unlicensed frequency band. The licensed communication system 100 may be any communication system that uses a portion of frequency spectrum (frequency band) that is licensed to the system operator by a government agency, such as the Federal Communications Commission (FCC). For the examples discussed herein, the licensed communication system 100 is a cellular system that operates in accordance with at least one revision of The Third-Generation Partnership Project Long-Term Evolution (3GPP LTE) communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate with the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations, such as WiFi, Bluetooth, and Zigbee. For the example of FIG. 1, an eNB 104 provides wireless service to user equipment (UE) devices 106, 108, 110 within a geographical service area (licensed service area) 102 using one or more licensed frequency bands.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNB 104 can be any type of communication station or transceiver station or radio head and may be referred to as a base station, eNodeB, fixed station, access point, and other terms. The eNB 104 is typically connected within a network of several other eNBs through a backhaul. The UE devices 106, 108, 110 are any type of user devices and are sometimes referred to by other terms such as, for example, handset, phone, smartphone, mobile device, portable device, and modems. Communication using the licensed band may include downlink transmissions from the eNB to UE devices, uplink communication from UE devices to the eNB, and device-to-device (D2D) communication between two or more UE devices. The bi-directional arrows between the UE devices and the eNB in FIG. 1 represent a connection and/or an association but do not necessarily indicate an ongoing communication session. For example, a UE device may be registered to the eNB and receiving control information but not exchanging data with the eNB.

Other unlicensed devices 112, 114, 116, 118 within the licensed service area 102 use an unlicensed frequency band for communication. The unlicensed devices 112, 114, 116, 118 may include access points 112 providing service to mobile devices 114 and devices 116, 118 operating in device-to-device communication scenarios. The unlicensed communications may be ad hoc communication scenarios and may be bidirectional or one way. Accordingly, the unlicensed devices 112, 114, 116, 118 may include various types of devices and equipment. For the example of FIG. 1, an access point 112 provides wireless service to mobile devices 114 within an unlicensed service area 120 and two other devices 116, 118 communicate directly with each other using the unlicensed frequency band.

For the examples herein, the licensed equipment 104, 106, 108, 110 uses the unlicensed frequency band for communication at times determined to avoid interference or at least to result in a tolerable level of interface with communication between unlicensed devices and, in some situations, other licensed devices using the unlicensed frequency band. The unlicensed frequency band is monitored prior to transmission to determine if the band is currently in use. If it is determined that the band is not in use, the licensed equipment transmits signals within the unlicensed frequency band. For the example of FIG. 1, dashed arrows indicate transmissions within the unlicensed band by the licensed system equipment. In some scenarios, UE devices 108, 110 transmit signals 122, 124 to the eNB 104 within the unlicensed frequency band. The signals 122, 124 reach the unlicensed devices that are sufficiently close depending on the power level of the signal. For example, the signal 122 from one UE device 122 may reach the access point 112 and the unlicensed mobile device 114 and the signal 124 from second UE device 110 may reach the unlicensed mobile device 116, 118. In another scenario, the eNB 104 transmits a signal 126 within the unlicensed frequency band to one or more UE devices 110 and the signal 126 may reach the unlicensed mobile devices 116, 118. The unlicensed mobile device 118 may be outside of the licensed service area 102 in some situations. Since the unlicensed frequency band is monitored for energy prior to transmission by the UE device 108, interference at the unlicensed devices is reduced. In addition, interference at the licensed devices due to transmission by the unlicensed devices is also reduced.

The licensed communication system 100 uses timing and a timing structure to transmit and receive signals where the timing structure divides and organizes time into an arrangement of units and subunits. For the examples herein, the timing structure adheres to at least one revision of the 3GPP LTE standard and includes at least frames, subframes, timeslots, and symbol times.

The system timing structure and timing of the licensed system 100 is applied to the unlicensed frequency band such that transmissions within the unlicensed band correspond to the timing of the licensed system. For example, signals may be transmitted within the unlicensed band at particular subframes or time slots that are aligned with the subframes and times slots of the licensed frequency band. As discussed below, the signals may also be transmitted in the unlicensed frequency band using the same timing structure as used in the licensed band but an offset by multiple timing units (e.g., symbol periods).

Figure 2:
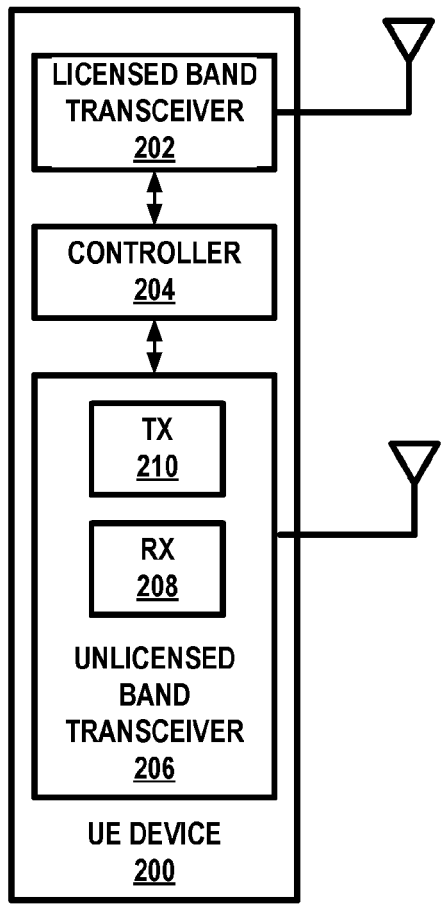
FIG. 2 is a block diagram of an example of a UE device suitable for use as one of the UE devices in FIG. 1.

FIG. 2 is a block diagram of an example of a UE device 200 suitable for use as one of the UE devices 106, 108, 110 in FIG. 1. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may also be used in some situations to transmit a reserve signal in the unlicensed frequency band as discussed below in further detail. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, D2D control information from another UE, and/or D2D data information from another UE device.

The licensed band transceiver 202 includes a transmitter that transmits uplink wireless signals to the eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 208 and other components such as memory.

Figure 3:
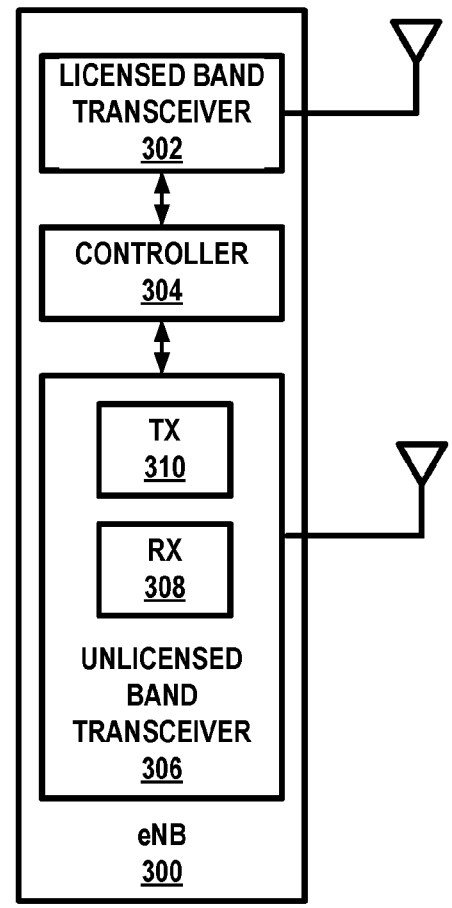
FIG. 3 is a block diagram of an example of an enhanced Node B (eNB) suitable for use as the eNB in FIG. 1.

FIG. 3 is a block diagram of an example of an eNB 300 suitable for use as the eNB 104 in FIG. 1. The eNB 300 includes a licensed band transceiver 302, a controller 304, as well as other components and circuitry (not shown) such as memory, for example. For the examples herein, the eNB also includes an unlicensed band transceiver 306 which includes an unlicensed band receiver 308 and an unlicensed band transmitter 310. The unlicensed band transmitter 310 transmits signals over the unlicensed frequency band where, depending on the situation, the signals may provide downlink control information to the UE device and downlink data information to the UE device. The unlicensed band transmitter 310 may also be used in some situations to transmit a reserve signal in the unlicensed frequency band as discussed below in further detail. The unlicensed band transmitter 310 may be omitted from the eNB 300. This may be the case where the eNB is used to only monitor the unlicensed band and/or only to receive signals within the unlicensed band. The licensed band transceiver 302 exchanges wireless signals with the UE devices 104, 106, 108, 110 within the service area 102. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. As discussed below in further detail, at least one of the timing parameters is applied to the unlicensed frequency band.

Figure 4A:
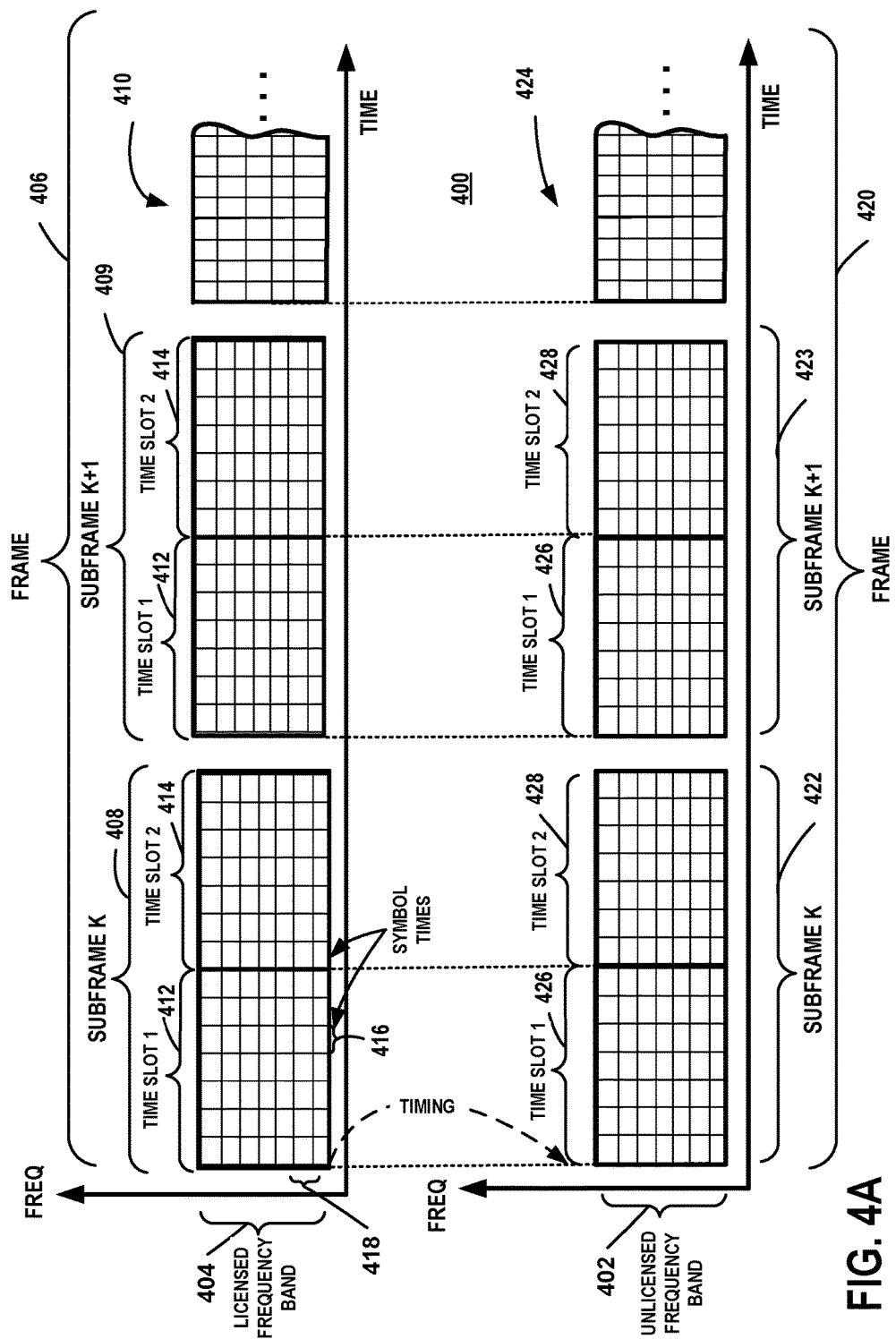
FIG. 4A is an illustration of an unlicensed frequency band and a licensed frequency band where the timing and timing structure used by a licensed system in the licensed frequency band is used for communication in the unlicensed frequency band.
Figure 4B:
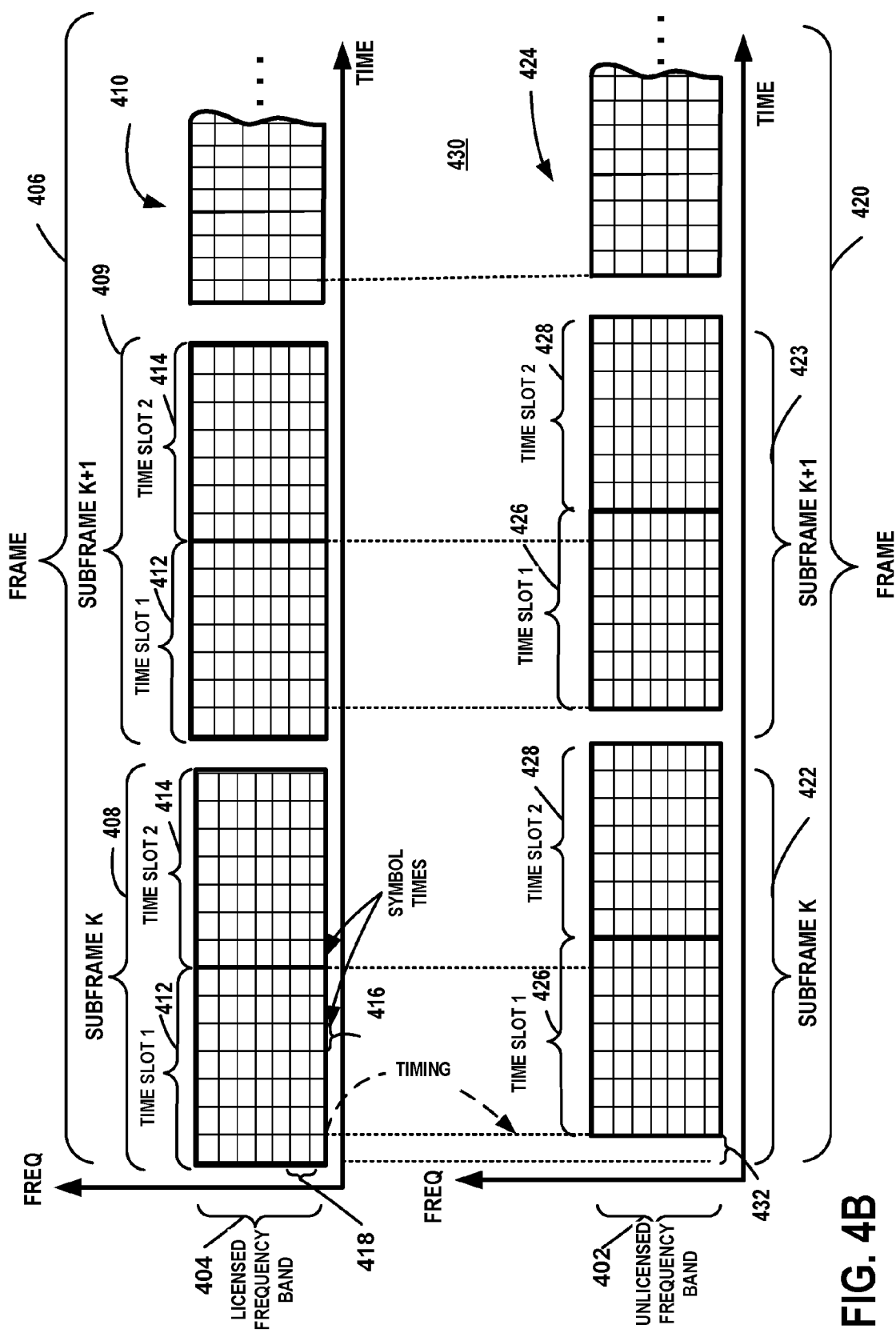
FIG. 4B is an illustration of the unlicensed frequency band and the licensed frequency band where the timing and timing structure used by a licensed system in the licensed frequency band is used for communication in the unlicensed frequency band and the timing structure in the unlicensed frequency band is offset from the timing structure in the licensed frequency band.

FIG. 4A is an illustration of an unlicensed frequency band 402 and a licensed frequency band 404 where the timing and the timing structure used by a licensed system in the licensed frequency band 404 is used for communication in the unlicensed frequency band 402. The illustrations of FIG. 4A and FIG. 4B are frequency-time graphs 400, 430 showing frequency-time resource elements in the licensed frequency band 402 and the timing applied to the unlicensed frequency band. The graphs 400, 430 are not necessarily drawn to scale and only provide exemplary visual representations. The timing used by the licensed system in the licensed frequency band is at least partially based on the communication specification with which the system operates and on the regulations of the frequency band. Time can be organized in numerous ways to establish the timing structure (timing scheme) of the system. For the examples herein, time is at least organized into frames 406, subframes 408, 409, 410, time slots 412, 414 and symbol times 416. For the example, the timing and the timing structure used in the licensed frequency band 402 is in accordance with one or more releases of the 3GPP LTE communication specification.

The frame 406 includes a plurality of subframes including at least a first subframe (K) 108 and a second subframe (K+1) 409. For LTE, each frame includes 10 subframes and each subframe includes 2 time slots. The time slots are further divided into symbol times, where for LTE communication specifications, each time slot includes seven symbol times 416. For LTE, the licensed frequency band 404 is divided into subcarriers 418. The combination of symbol times and subcarriers defines resource elements. Other timing schemes and structures can be used in the licensed frequency band 406.

As discussed above, the licensed equipment uses the unlicensed frequency band 402 for communication where a UE device and/or an eNB transmit signals over the unlicensed frequency band 402 in accordance with the timing used in the licensed frequency band 404. The timing structure used in the licensed system is also applied to the unlicensed frequency band. For the example of FIG. 4A, the licensed system applies the frame, subframe, timeslot and symbol time structure to the unlicensed frequency band 402.

For the example, therefore, the licensed equipment transmits signals within the unlicensed frequency band 402 in accordance with the timing and the timing structure used in the licensed frequency band 404. Accordingly, a frame 420 applied in the unlicensed frequency band corresponds to the frame 406 in the licensed frequency band 402. The subframes 422, 423, 424, timeslots 426, 428, and symbol times applied to the unlicensed frequency band correspond to the subframes 408, 409, 410 timeslots 412, 414, and symbol times 416 in the licensed band. Although FIG. 4A shows the timing structure of the two bands as aligned, in some situations, the timing structure may be offset by some multiple of symbol times, timeslots, subframes, or other timing structure unit.

FIG. 4B is an illustration of an unlicensed frequency band 402 and a licensed frequency band 404 where the timing and the timing structure used by a licensed system in the licensed frequency band 404 is used for communication in the unlicensed frequency band 402 and the timing structure in the unlicensed frequency band is offset from the timing structure in the licensed frequency band. The timing structure in the unlicensed frequency band has an offset 432 from the timing structure in the licensed band. For the example of FIG. 4B, the offset is one symbol time (symbol period). The offset 432 may be any multiple of symbol times. As shown in FIG. 4B, the edges of symbol times are aligned illustrating that the timing of the licensed band is applied in the unlicensed band.

Figure 5:
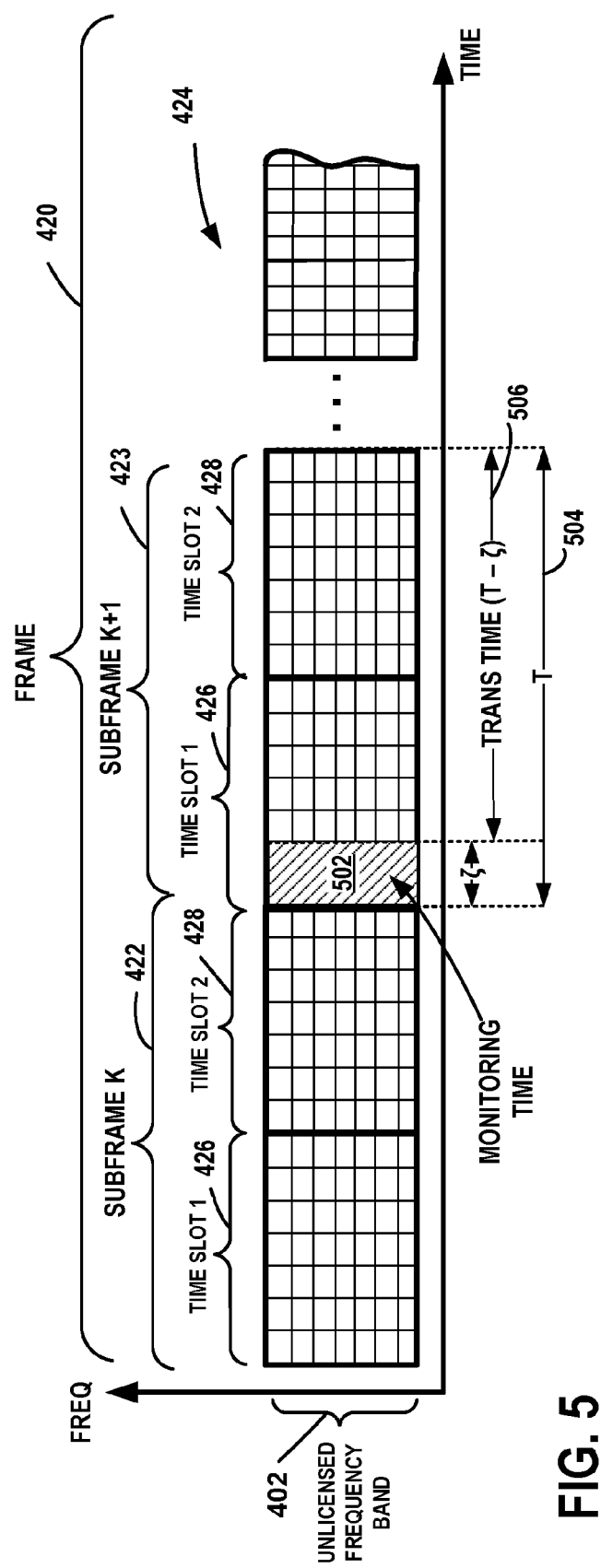
FIG. 5 is a graphical illustration of the unlicensed frequency band for an example where the unlicensed frequency band is monitored within the subframe used for transmission within the unlicensed frequency band.

FIG. 5 is a graphical illustration of the unlicensed frequency band for an example where the unlicensed frequency band is monitored within the subframe used for transmission within the unlicensed frequency band 402. As discussed below, the monitoring may be performed by an eNB or a UE device. For the examples herein, the monitoring or sensing, of the unlicensed frequency band is performed in accordance with techniques used by the unlicensed equipment using the unlicensed frequency band. For example, if the unlicensed frequency band is the 2.4 GHz band typically used by systems adhering to 802.11 standards, the monitoring is performed by the transmitting device using techniques similar to the techniques used by 802.11 devices. Any of various techniques, however, may be used to "sense", "listen to" or otherwise monitor the unlicensed frequency band. The transmitting devices include electronics for measuring the energy within the unlicensed frequency band and comparing the measured energy to a threshold. If the measured energy exceeds the threshold, the transmitting device determines that the band is in use. In some situations, the energy within the entire unlicensed frequency band is measured. In other situations, only a portion of the spectrum of the unlicensed frequency band is measured. For example, if the transmitting device is determining whether other licensed devices are using the unlicensed frequency band, the transmitting device may look at specific subcarriers where energy will be present if a licensed device is using the frequency band. Such subcarriers may be used for transmitting reference signals, for example.

The monitoring device (eNB or UE device), therefore, determines if the unlicensed frequency band is in use. The monitoring device, for example, may compare a measured energy level to a threshold and determine that the frequency band is not in used if the measures level is below the threshold. The duration ($\zeta$) of the monitoring time 502 is selected to provide sufficient time for measuring the energy level in the band or at least detecting energy in the band. An example of a suitable monitoring time duration is on the order of 0.1~0.5 ms or about 2~10% of the total data transmit burst duration. In some situations, the duration is a multiple of symbol duration. For example, the duration, $\zeta$=0.5×symbol time where the symbol time is about 71.8 microseconds in LTE. Where the monitoring time ($\zeta$) 502 is within the subframe that will be used for communication, however, the monitoring time ($\zeta$) should be minimized in order to maximize the time available for communication. For the example of FIG. 5, the period of a subframe is represented by "T". Accordingly, the time available for communication (transmission time) is T-$\zeta$.

Figure 6:
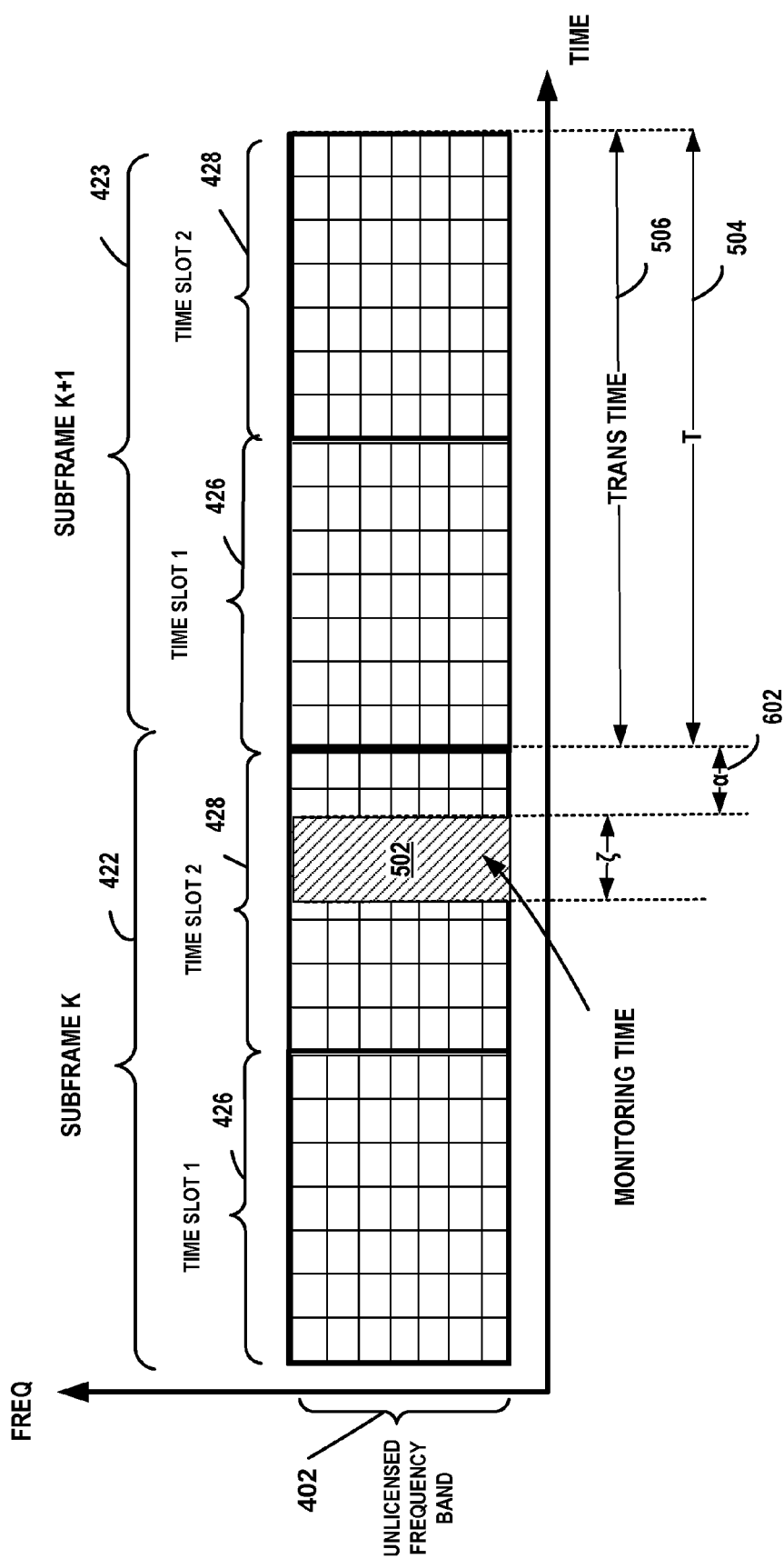
FIG. 6 is a graphical illustration of the unlicensed frequency band for an example where the unlicensed frequency band is monitored within a previous subframe to the subframe used for transmission within the unlicensed frequency band.

FIG. 6 is a graphical illustration of the unlicensed frequency band for an example where the unlicensed frequency band 402 is monitored within a previous subframe 422 to the subframe 423 used for transmission within the unlicensed frequency band 402. For the example of FIG. 6, the unlicensed frequency band is monitored (sensed) during the monitoring time 502 in subframe K 422 at an offset ($\alpha$) 602 from the start of subframe K+1 423. The offset is greater than or equal to zero ($\alpha$≤0). The subframe K ends and the subframe K+1 starts when the offset is equal to zero ($\alpha$=0). Since the monitoring is performed in the previous subframe, the entire subframe K+1 423 is available for transmission. Therefore, in some situations, the transmission time 506 is equal to subframe period (T) 504.

The monitoring time duration ($\zeta$) 502 is selected to provide sufficient time for measuring the energy level in the band or at least detecting energy in the band. The offset ($\alpha$) 602 from the start of transmission subframe K+1 423 is selected to be short enough to minimize the likelihood of interference.

Figure 7:
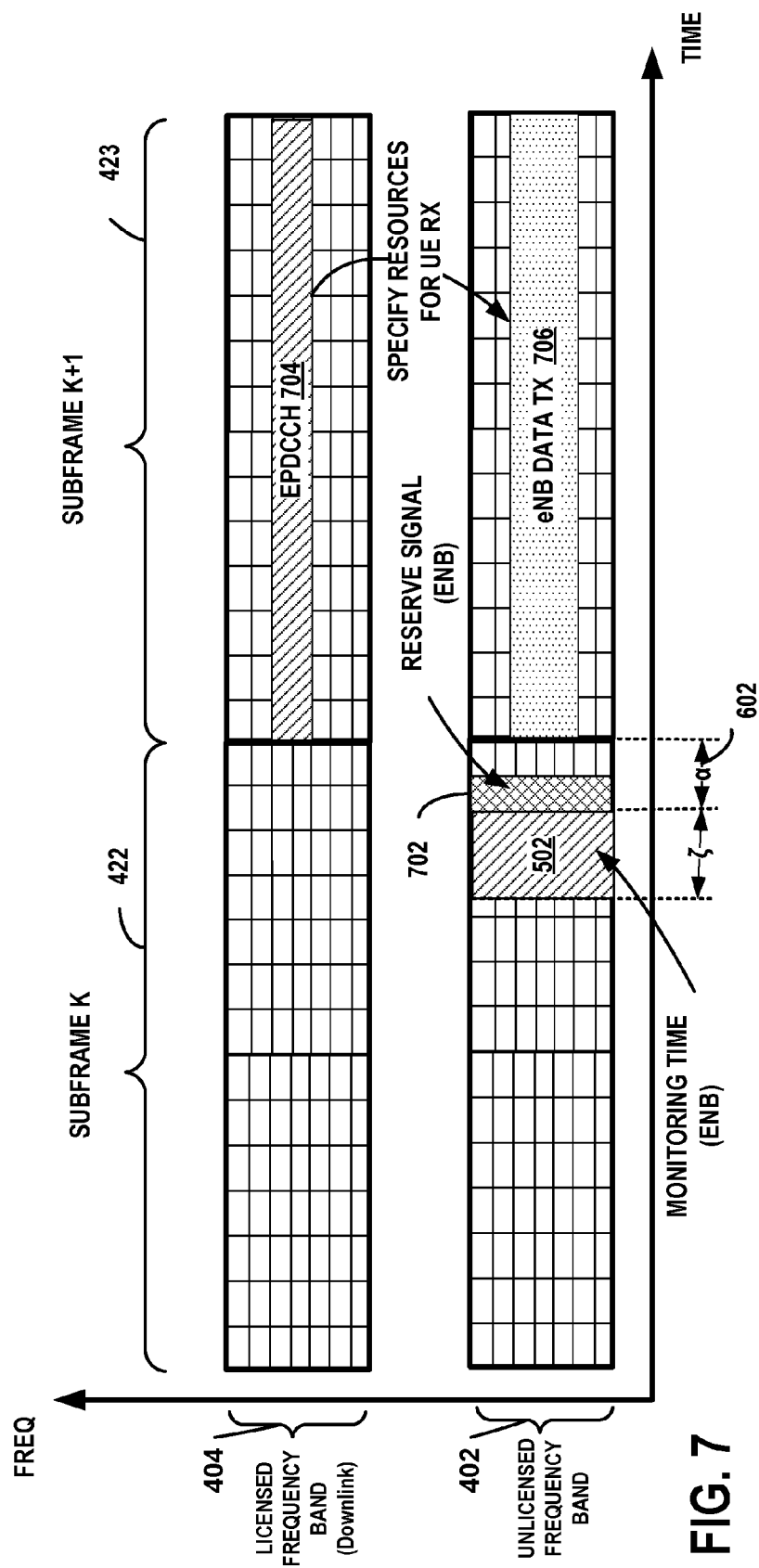
FIG. 7 is a graphical illustration of an example where an eNB monitors the unlicensed frequency band, transmits a reserve signal, and transmits data within the unlicensed frequency band.

FIG. 7 is a graphical illustration of an example where an eNB monitors the unlicensed frequency band, transmits a reserve signal, and transmits data within the unlicensed frequency band. For the example of FIG. 7, the eNB monitors the unlicensed frequency band 402 in the K subframe 422 at an offset 602 from the K+1 subframe 423. If the eNB determines that the unlicensed frequency band is not in use, the eNB transmits a reserve signal 702 within the unlicensed frequency band 402. The reserve signal 702 can be any type of transmission that would result in other nearby devices that are monitoring the frequency band 402 to determine that the frequency band 402 is in use. In some circumstances, the reserve signal 702 may mimic signals used by the unlicensed equipment for assisting in detection and interference. For example, where the unlicensed frequency band 402 is a frequency band where IEEE 802.11 standards apply, the reserve signal 702 may mimic a Request to Send (RTS) signal. The optional RTS/CTS (Request to Send/Clear to Send) mechanism allows a device to reserve bandwidth for a time period. In accordance with optional mechanism, a device using RTS/CTS will refrain from sending a data frame until the device completes a RTS/CTS communication with another device, such as, for example, an access point. The device initiates the process by sending an RTS frame. The other device (e.g., access point) receives the RTS and responds with a CTS frame which must be received by the device before the device sends a data frame. The CTS also contains a time value that alerts other devices to hold off from accessing the unlicensed frequency band while the device that initiated the RTS procedure is transmitting data. For the example of FIG. 7, the eNB may transmit a reserve signal 702 that is an RTS signal. Although, IEEE 802.11 protocols require the receiver to transmit CTS in response to RTS, transmission of the CTS is not necessarily transmitted in response to the reserve signal 702. In some situations, the receiving device receiving the reserve signal transmits an acknowledgment signal that mimics a CTS. In other situation, the receiving device does not respond and simply waits for the data transmission after receiving the RTS. The other devices will see the RTS and assume the channel is taken. In still other situations, the transmitting device extends the duration of the RTS signal until the subframe boundary and then begins transmitting the data transmission. The transmitting device may extend the RTS signal by continually repeating the RTS signal until data transmission. In this, way the transmitting device occupies the channel so that the other devices do not transmit as they detect energy in the channel due to RTS transmissions. The transmitting device may also reserve the medium by transmitting a reserve signal containing no meaningful information (for example, "00000") thereby occupying the channel until the next subframe boundary.

The eNB transmits a control signal 704 in the downlink licensed frequency band 404 identifying the resources used in the unlicensed frequency band 402 for communication from the eNB to one or more UE devices. In some circumstances, the control signal 704 is a Physical Downlink Control Channel (PDCCH). In other situations, the control signal is an Enhanced Physical Downlink Control Channel (EPDCCH) as shown in FIG. 7. The eNB transits data 706 to the UE device within the unlicensed frequency band over the resources specified by the control channel. The control channel can be transmitted within the same subframe 423 when the data is transmitted because the UE device buffers data received in the unlicensed frequency band and can then decode the information after determining the resources used from the control channel.

Figure 8:
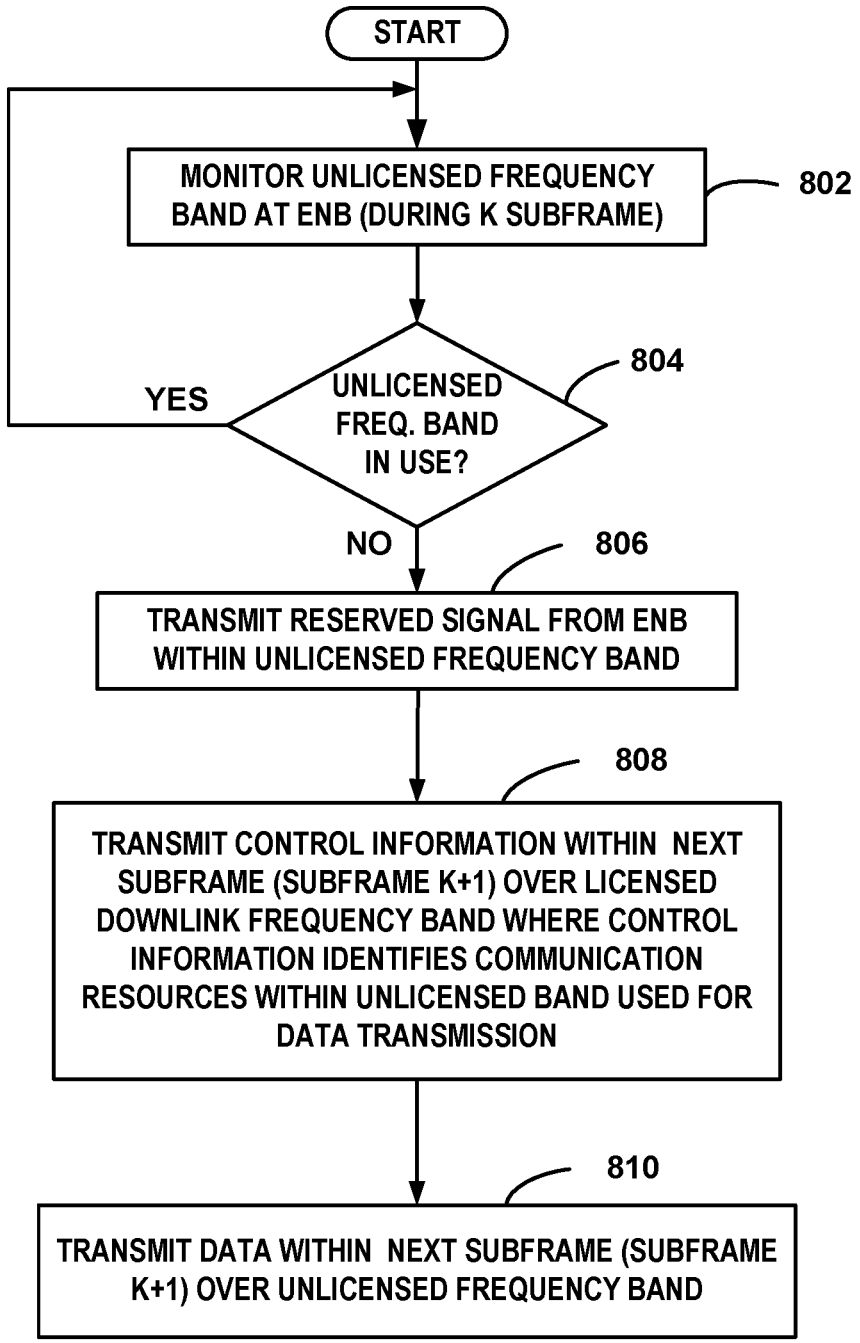
FIG. 8 is a flowchart of a method performed at the eNB for the example where an eNB monitors the unlicensed frequency band, transmits a reserve signal, and transmits data within the unlicensed frequency band.

FIG. 8 is a flowchart of a method performed at the eNB for the example where an eNB monitors the unlicensed frequency band, transmits a reserve signal, and transmits data within the unlicensed frequency band.

At step 802, the eNB monitors the unlicensed frequency band. During the K subframe, the eNB senses the unlicensed frequency band. As discussed above, techniques similar to those used by the unlicensed equipment can be used to monitor the unlicensed frequency band.

At step 804, the eNB determines whether the unlicensed frequency band is in use. Measurements obtained by the monitoring can be compared to a threshold, for example. If the unlicensed frequency band is in use, the eNB returns to step 802 to continue monitoring the unlicensed frequency band. If the unlicensed frequency band is not in use, the procedure continues at step 806.

At step 806, the eNB transmits a reserve signal 702 within the unlicensed frequency band. An example of a suitable reserve signal 702 is an RTS signal transmitted in accordance with the IEEE 802.11 standard.

At step 808, the eNB transmits control information within the next subframe (subframe K+1) 423 over the licensed downlink frequency band 404. The control information 704 identifies/specifies the communication resources within the unlicensed frequency band used for data transmission from the eNB. The control information, therefore, specifies frequencies and times of the data transmission. The control information may be transmitted within the EPDCCH or the PDCCH to one or more UE devices.

In some situations as discussed above, a reservation confirmation signal (acknowledgment signal) may be transmitted from the eNB in the K+1 subframe indicating that the reservation was successful. Such a signal can be transmitted in the EPDCCH and may be useful for robustness or where the UE device is not monitoring the unlicensed frequency band for the reserve signal (e.g., RTS).

At step 810, the eNB transmits the data to the one or more UE devices within the K+1 subframe 423 in the unlicensed frequency band 402. For the example of FIG. 7 and FIG. 8, therefore, the eNB transmits the control information and the data in the same subframe where the control information is transmitted in the licensed frequency band and the data is transmitted in the unlicensed frequency band.

Figure 9:
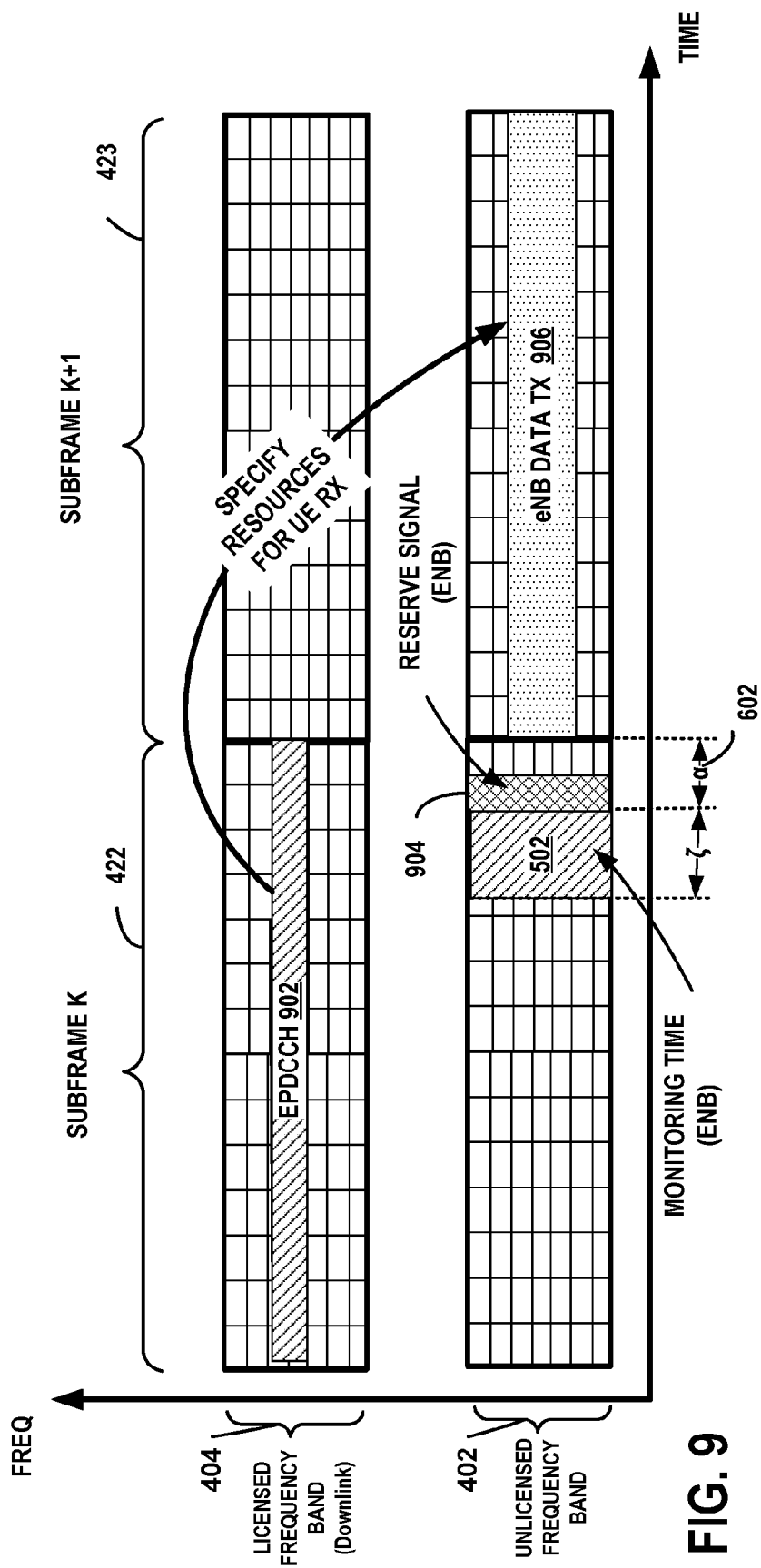
FIG. 9 is a graphical illustration of an example where an eNB monitors the unlicensed frequency band, transmits a reserve signal, and transmits data within the unlicensed frequency band with control information transmitted in the prior subframe to the subframe where the data is transmitted.

FIG. 9 is a graphical illustration of an example where an eNB monitors the unlicensed frequency band, transmits a reserve signal, and transmits data within the unlicensed frequency band with control information transmitted in the prior subframe to the subframe where the data is transmitted. Accordingly, the example of FIG. 9 is similar to the example of FIG. 7 except that the control information 902 is transmitted before the data is transmitted. For the example of FIG. 9, the control information 902 is transmitted in the K subframe 422 and the data is transmitted in the K+1 subframe 423. In some situations, the control information may be transmitted prior to the K subframe. Generally, the control information 902 may be transmitted in any subframe prior to the subframe where the data is transmitted or in the same subframe as discussed with reference to FIG. 7. For the example, the control information 902 is transmitted in the K-Q subframe, where Q is 0, 1, 2, 3, or 4. As discussed above, the eNB monitors the unlicensed frequency band 402 in the K subframe 422 at an offset 602 from the K+1 subframe 423. If the eNB determines that the unlicensed frequency band is not in use, the eNB transmits a reserve signal 904 within the unlicensed frequency band 402. The reserve signal 904 can be any type of transmission that would result in other nearby devices that are monitoring the frequency band 402 to determine that the frequency band 402 is in use. In some circumstances, the reserve signal 904 may mimic signals used by the unlicensed equipment for assisting in detection and interference. For example, where the unlicensed frequency band 402 is a frequency band where IEEE 802.11 standards apply, the reserve signal 904 may mimic a Request to Send (RTS) signal.

The eNB transmits control information 902 in the downlink licensed frequency band 404 identifying the resources used in the unlicensed frequency band 402 for communication from the eNB to one or more UE devices. For the example of FIG. 9, the control information is transmitted within the same subframe (subframe K) 422 where the eNB monitors the unlicensed frequency band. The control information indentifies the frequency and time of the data transmission in the unlicensed frequency band. In some circumstances, the control signal 704 is a Physical Downlink Control Channel (PDCCH). In other situations, the control signal is an Enhanced Physical Downlink Control Channel (EPDCCH) as shown in FIG. 9. The eNB transits data 906 to one or more UE devices within the unlicensed frequency band over the resources specified by the control channel within the K+1 subframe 423.

Figure 10:
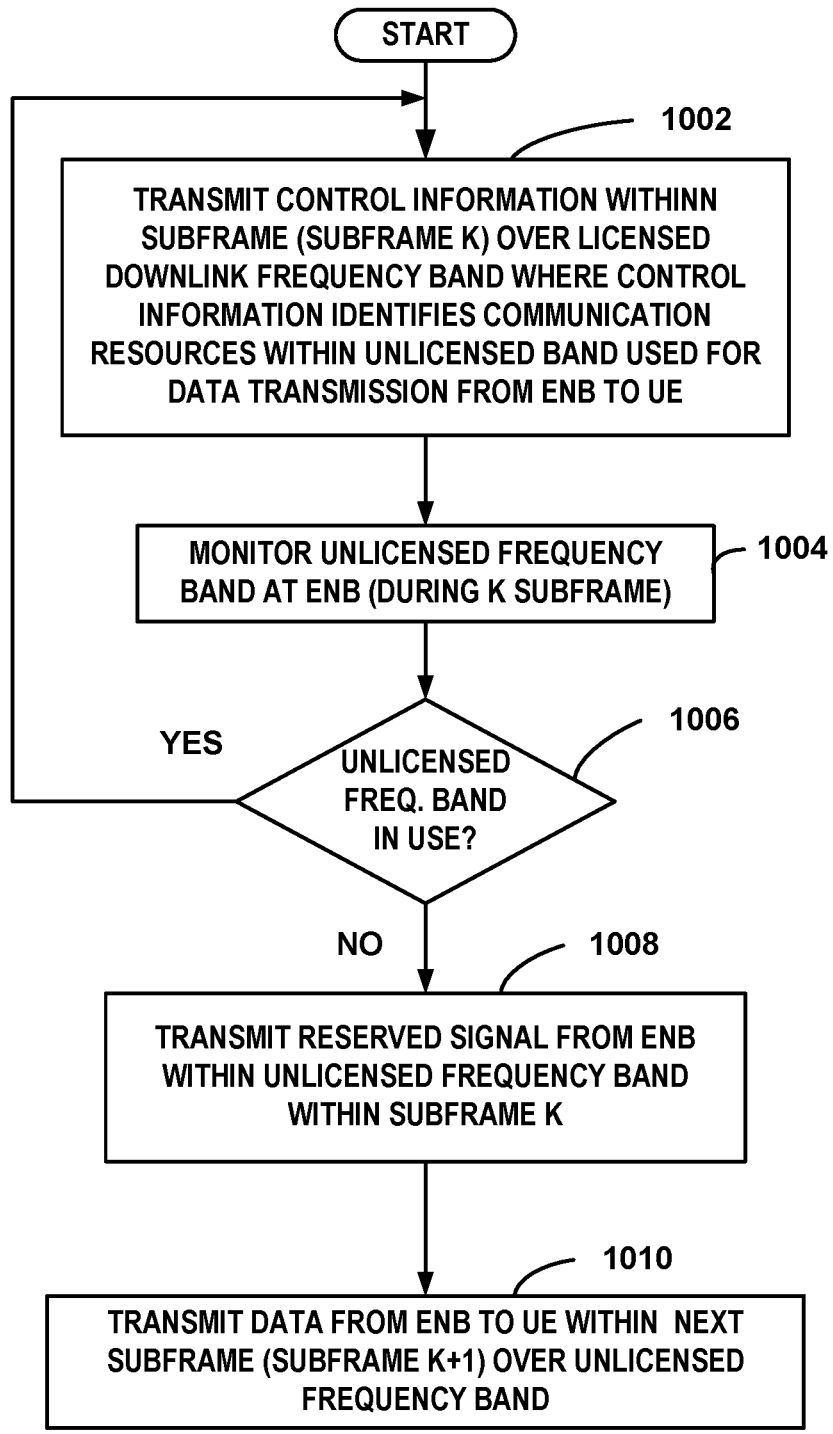
FIG. 10 is a flowchart of a method performed at the eNB for the example where an eNB monitors the unlicensed frequency band, transmits a reserve signal, transmits data within the unlicensed frequency band, and transmits the control information in the subframe prior to the subframe where the data is transmitted.

FIG. 10 is a flowchart of a method performed at the eNB for the example where an eNB monitors the unlicensed frequency band, transmits a reserve signal, transmits data within the unlicensed frequency band, and transmits the control information in the subframe prior to the subframe where the data is transmitted.

At step 1002, the eNB transmits control information within the subframe (subframe K) 422 over the licensed downlink frequency band 404. The control information 902 identifies/specifies the communication resources within the unlicensed frequency band used for data transmission from the eNB. The control information, therefore, specifies frequencies and times of the data transmission. The control information may be transmitted within the EPDCCH or the PDCCH to one or more UE devices.

At step 1004, the eNB monitors the unlicensed frequency band. During the K subframe, the eNB senses the unlicensed frequency band. As discussed above, techniques similar to those used by the unlicensed equipment can be used to monitor the unlicensed frequency band.

At step 1006, the eNB determines whether the unlicensed frequency band is in use. Measurements obtained by the monitoring can be compared to a threshold, for example. If the unlicensed frequency band is in use, the eNB returns to step 1002 to transmit new control information and to continue monitoring the unlicensed frequency band at step 1004. If the unlicensed frequency band is not in use, the procedure continues at step 1008.

At step 1008, the eNB transmits a reserve signal 904 within the unlicensed frequency band. An example of a suitable reserve signal 904 is an RTS signal transmitted in accordance with the IEEE 802.11 standard.

At step 1010, the eNB transmits the data to the one or more UE devices within the K+1 subframe 423 in the unlicensed frequency band 402. For the example of FIG. 9 and FIG. 10, therefore, the eNB transmits the control information in the subframe (K) prior to the subframe where the data is transmitted where the control information 902 is transmitted in the licensed frequency band and the data is transmitted in the unlicensed frequency band.

Figure 11:
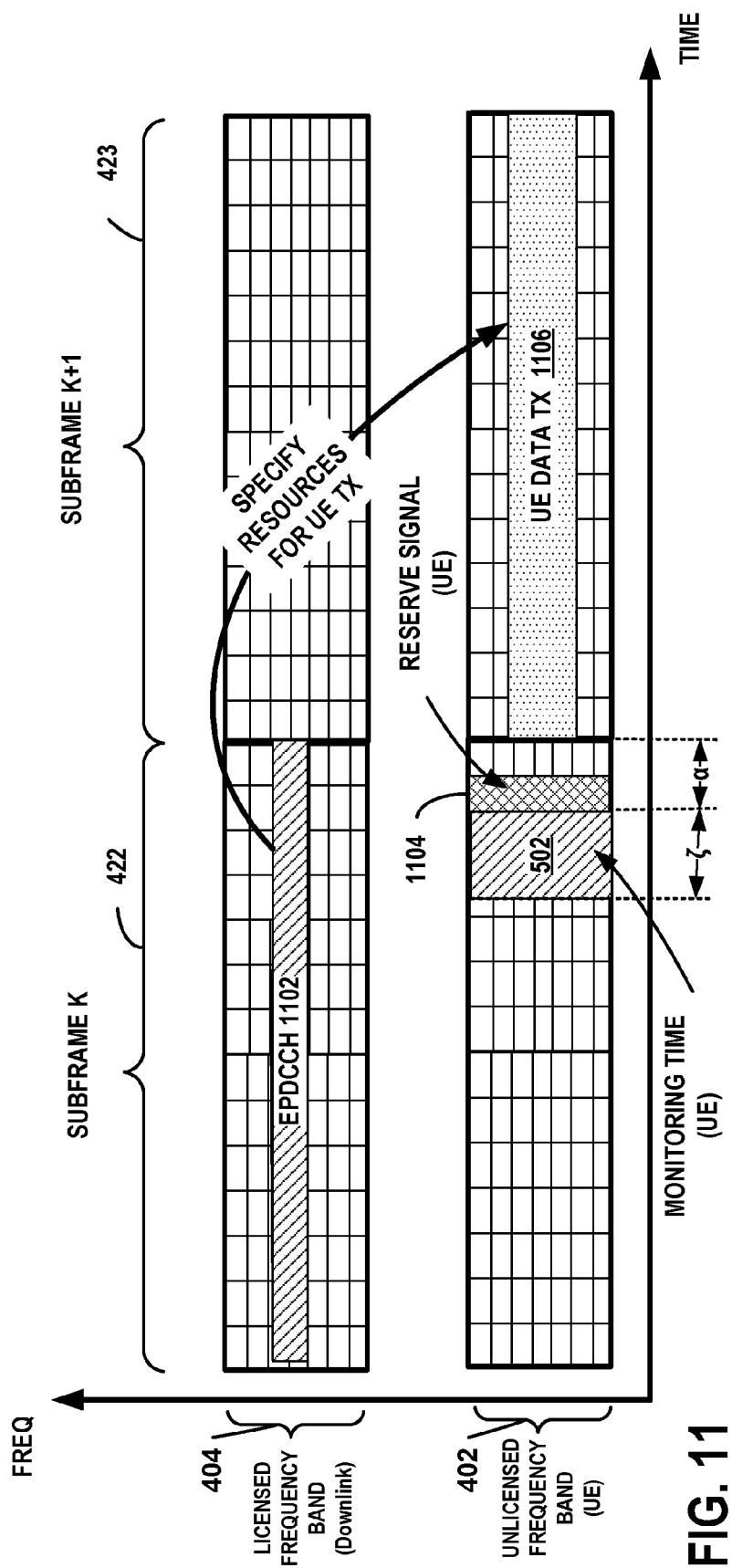
FIG. 11 is a graphical illustration of an example where an eNB monitors the unlicensed frequency band and transmits a reserve signal and a UE device transmits data within the unlicensed frequency band.

FIG. 11 is a graphical illustration of an example where an eNB monitors the unlicensed frequency band and transmits a reserve signal and a UE device transmits data within the unlicensed frequency band.

The eNB transmits control information to one or more UE devices in the K subframe 422. The control information 1102 specifies resources that should be used by the UE device in the unlicensed frequency band for transmitting data in the K+1 subframe 423. The control information 1102 may be transmitted in the PDCCH or the EPDCCH. For the example of FIG. 11, the control information 1102 is transmitted in the K subframe 422 and the data is transmitted in the K+1 subframe 423. In some situations, the control information may be transmitted prior to the K subframe. Generally, the control information 1102 may be transmitted in any subframe prior to the subframe where the data is transmitted. For the example, the control information 1102 is transmitted in the K−Q subframe, where Q is 0, 1, 2, 3, or 4.

The UE device monitors the unlicensed frequency band 402 in the K subframe 422 at an offset 602 from the K+1 subframe 423. If the UE device determines that the unlicensed frequency band is not in use, the UE device transmits a reserve signal 1104 within the unlicensed frequency band 402. The reserve signal 1104 can be any type of transmission that would result in other nearby devices that are monitoring the frequency band 402 to determine that the frequency band 402 is in use. In some circumstances, the reserve signal 1104 may mimic signals used by the unlicensed equipment for assisting in detection and interference. For example, where the unlicensed frequency band 402 is a frequency band where IEEE 802.11 standards apply, the reserve signal 1104 may mimic a Request to Send (RTS) signal. In some circumstances when the UE device determines that the unlicensed band is in use, the UE transmits a notification to the eNB. Such a notification is transmitted within a licensed uplink channel.

The eNB may respond to the reserve signal with an acknowledgment response in some situations. Where the unlicensed equipment operates in accordance with IEEE 802.11 standards, for example, the eNB can transmit a CTS response in response to the RTS reserve signal.

The UE device transmits data 1106 within the K+1 subframe 423 to the eNB within the unlicensed frequency band over the resources specified by the control channel. If the UE device determines that the unlicensed frequency band is in use, the UE device does not transmit the data. The eNB may transmit new control information identifying the resources to be used in the next subframe.

Figure 12:
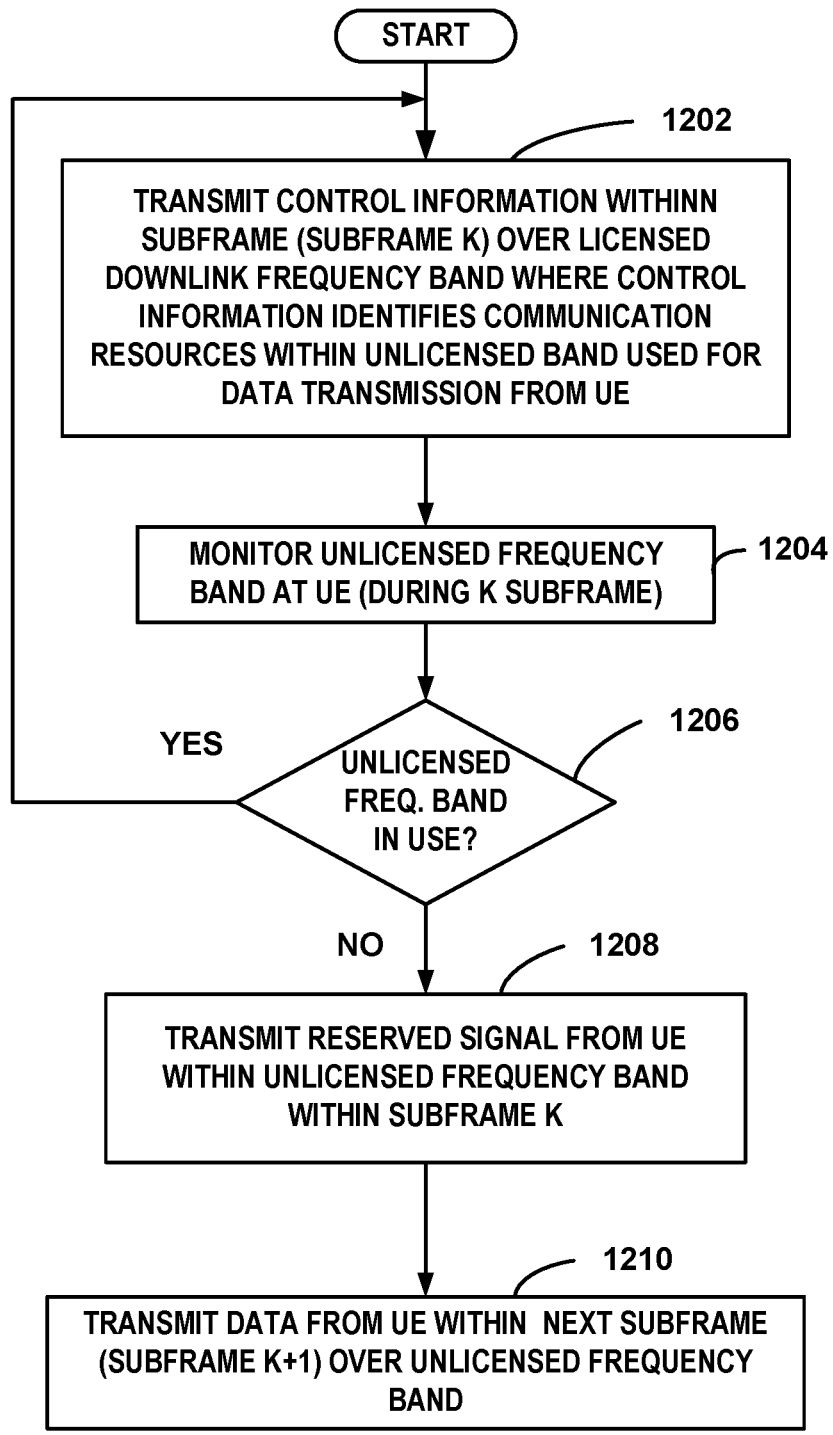
FIG. 12 is a flowchart of a method for the example where the eNB transmits control information and the UE device monitors the unlicensed frequency band, transmits a reserve signal, and transmits data within the unlicensed frequency band.

FIG. 12 is a flowchart of a method for the example where the eNB transmits control information and the UE device monitors the unlicensed frequency band, transmits a reserve signal, and transmits data within the unlicensed frequency band.

At step 1202, the eNB transmits control information within the subframe (subframe K) 422 over the licensed downlink frequency band 404. The control information 1202 identifies/specifies the communication resources within the unlicensed frequency band that should be used for data transmission from the UE device. The control information, therefore, specifies frequencies and times of the data transmission. The control information may be transmitted within the EPDCCH or the PDCCH to one or more UE devices.

At step 1204, the UE device monitors the unlicensed frequency band. During the K subframe, the UE device senses the unlicensed frequency band. As discussed above, techniques similar to those used by the unlicensed equipment can be used to monitor the unlicensed frequency band.

At step 1206, the UE device determines whether the unlicensed frequency band is in use. Measurements obtained by the monitoring can be compared to a threshold, for example. If the unlicensed frequency band is in use, the method returns to step 1202 where the eNB transmits new control information. The UE device then monitors the unlicensed frequency band at step 1004. If the unlicensed frequency band is not in use, the procedure continues at step 1008.

At step 1208, the UE device transmits a reserve signal 1104 within the unlicensed frequency band. An example of a suitable reserve signal 1104 is an RTS signal transmitted in accordance with the IEEE 802.11 standard.

At step 1210, the UE device transmits the data to the eNB within the K+1 subframe 423 in the unlicensed frequency band 402. For the example of FIG. 11 and FIG. 12, therefore, the eNB transmits the control information in the subframe (K) prior to the subframe where the UE transmits data where the control information is transmitted in the licensed frequency band and the data is transmitted in the unlicensed frequency band.

Figure 13:
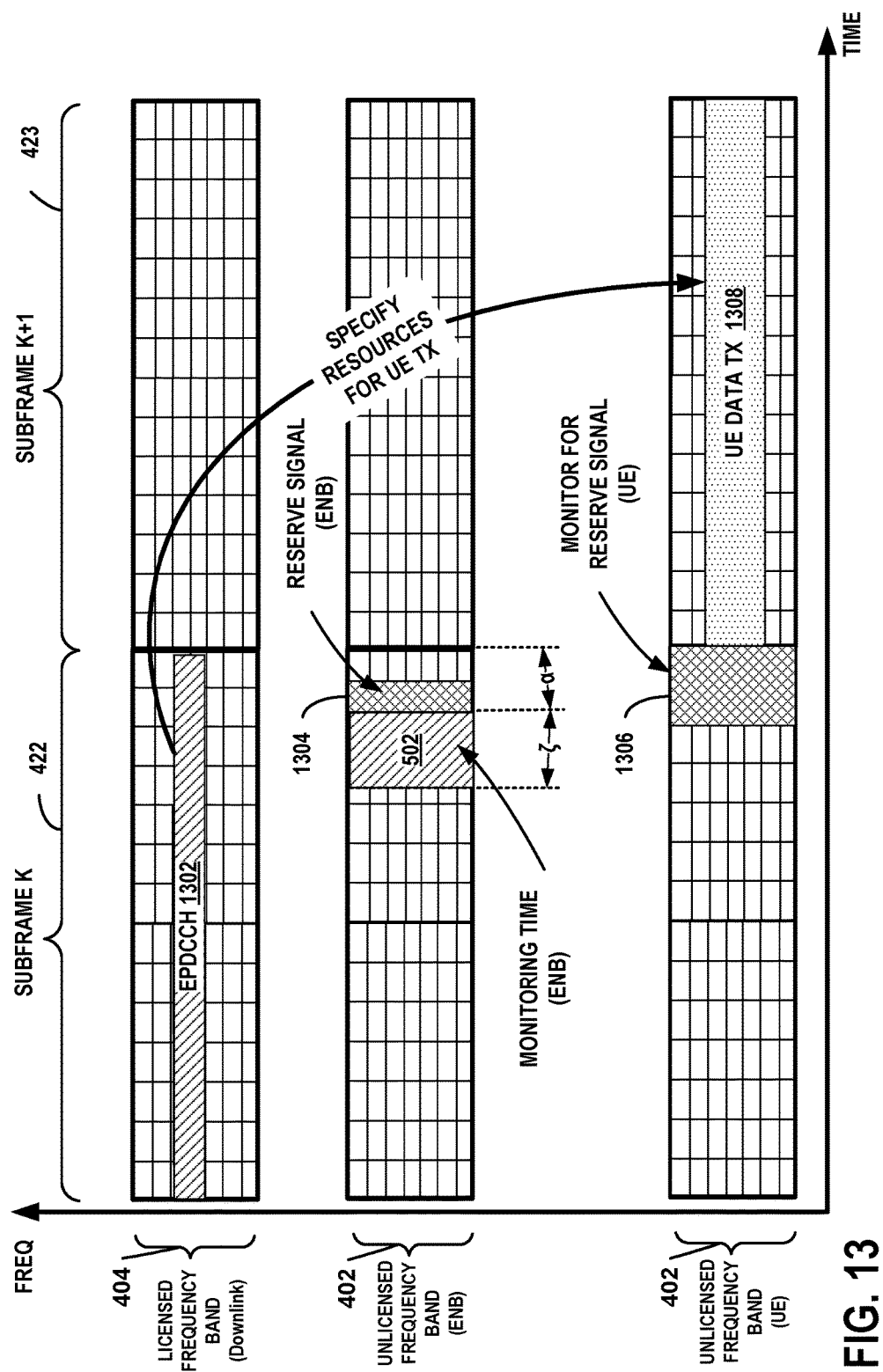
FIG. 13 is a graphical illustration of an example where an eNB transmits control information, monitors the unlicensed frequency band and transmits a reserve signal and the UE device transmits data within the unlicensed frequency band.

FIG. 13 is a graphical illustration of an example where an eNB transmits control information 1302, monitors the unlicensed frequency band and transmits a reserve signal and the UE device transmits data within the unlicensed frequency band. The eNB transmits control information in the licensed downlink frequency band to a UE device where the control information identifies the communication resources that should be used by the UE device to transmit data in the unlicensed frequency band. The control information 3012, therefore, identifies the frequency and time of the data transmission in the unlicensed frequency band. The eNB monitors the unlicensed frequency band 402 in the K subframe 422 at an offset 602 from the K+1 subframe 423. If the eNB determines that the unlicensed frequency band is not in use, the eNB transmits a reserve signal 1304 within the unlicensed frequency band 402. The reserve signal 1304 can be any type of transmission that would result in other nearby devices that are monitoring the frequency band 402 to determine that the frequency band 402 is in use. In some circumstances, the reserve signal 1304 may mimic signals used by the unlicensed equipment for assisting in detection and interference. For example, where the unlicensed frequency band 402 is a frequency band where IEEE 802.11 standards apply, the reserve signal 904 may mimic a Request to Send (RTS) signal. For the example of FIG. 13, the eNB monitors the unlicensed frequency band in the subframe (K) 422 where the control information is transmitted.

The UE device monitors the unlicensed frequency band for reserve signals. If the UE detects the reserve signal 1304 transmitted by the eNB, the UE device transmits the data using the resources within the unlicensed frequency band specified by the control information. If the reserve signal is not detected, the UE device does not transmit data in the unlicensed frequency band since the eNB may not have transmitted the reserve signal because the unlicensed frequency band was in use. The UE device transmits the data over within unlicensed frequency band over the resources specified by the control information within the K+1 subframe 423. For the example of FIG. 13, the control information 1302 is transmitted in the K subframe 422 and the data is transmitted in the K+1 subframe 423. In some situations, the control information 1302 may be transmitted prior to the K subframe. Generally, the control information 1302 may be transmitted in any subframe prior to the subframe where the data is transmitted. For the example, the control information 1302 is transmitted in the K–Q subframe, where Q is 0, 1, 2, 3, or 4.

Figure 14:
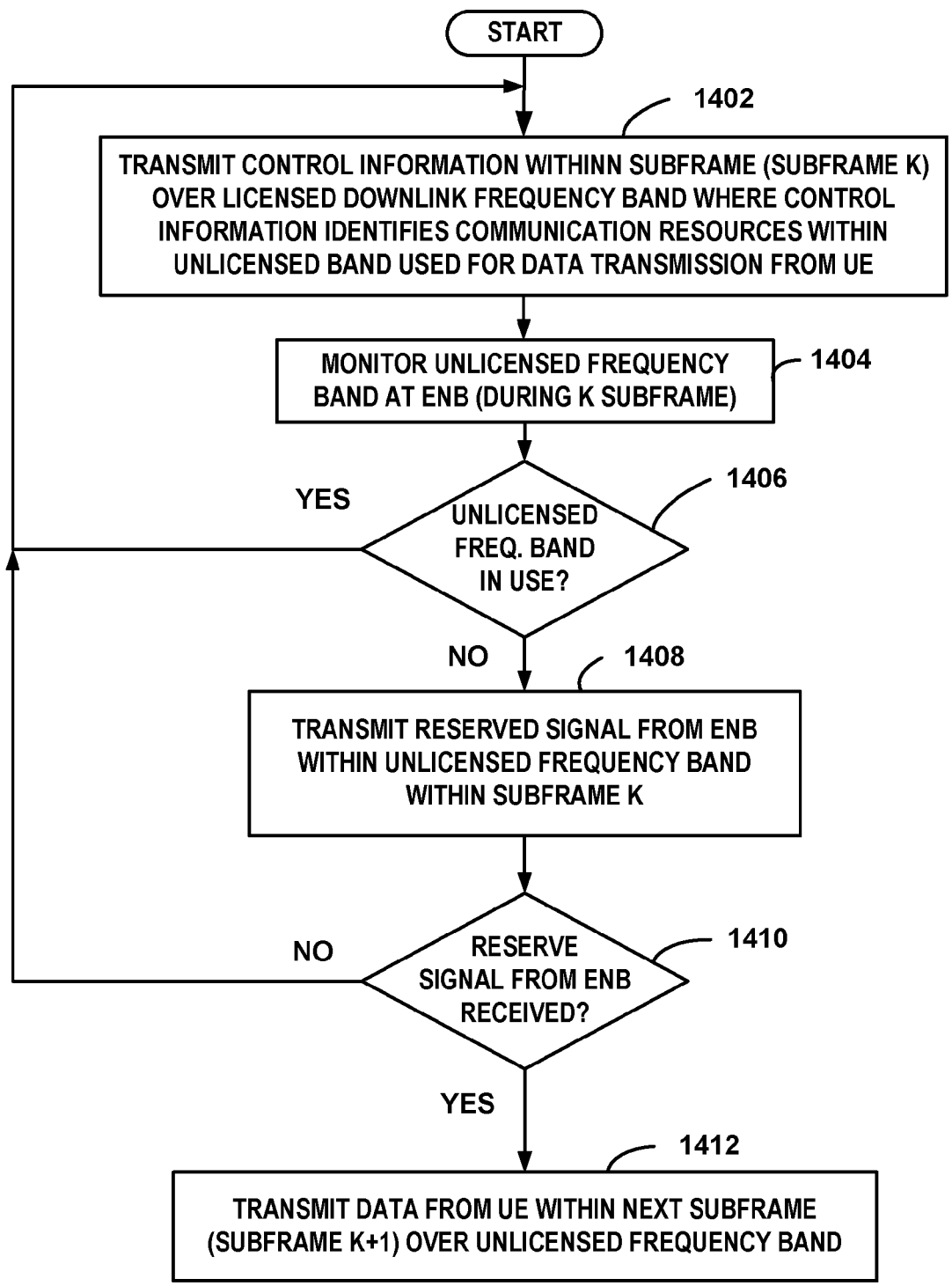
FIG. 14 is a flowchart of a method performed at the eNB for the example where an eNB monitors the unlicensed frequency band, transmits a reserve signal, transmits data within the unlicensed frequency band, and transmits the control information in the subframe prior to the subframe where the data is transmitted by the UE device.

FIG. 14 is a flowchart of a method performed at the eNB for the example where an eNB monitors the unlicensed frequency band, transmits a reserve signal, transmits data within the unlicensed frequency band, and transmits the control information in the subframe prior to the subframe where the data is transmitted by the UE device.

At step 1402, the eNB transmits control information within the subframe (subframe K) 422 over the licensed downlink frequency band 404. The control information 1302 identifies/specifies the communication resources within the unlicensed frequency band used for data transmission from the eNB. The control information, therefore, specifies frequencies and times of the data transmission. The control information may be transmitted within the EPDCCH or the PDCCH to one or more UE devices.

At step 1404, the eNB monitors the unlicensed frequency band. During the K subframe, the eNB senses the unlicensed frequency band. As discussed above, techniques similar to those used by the unlicensed equipment can be used to monitor the unlicensed frequency band.

At step 1406, the eNB determines whether the unlicensed frequency band is in use. Measurements obtained by the monitoring can be compared to a threshold, for example. If the unlicensed frequency band is in use, the eNB returns to step 1402 to transmit new control information and to continue monitoring the unlicensed frequency band at step 1404. If the unlicensed frequency band is not in use, the procedure continues at step 1408.

At step 1408, the eNB transmits a reserve signal 1304 within the unlicensed frequency band. An example of a suitable reserve signal 1304 is an RTS signal transmitted in accordance with the IEEE 802.11 standard.

At step 1410, the UE device determines if a reserve signal has been received from the eNB. The UE device monitors the unlicensed frequency band for reserve signals. If no reserve signal has been received the UE does not transmit any data in the unlicensed frequency band and the procedure returns to step 1402. If the reserve signal from the eNB is received at the UE device, the method continues at step 1412.

At step 1412, the UE device transmits the data the eNB within the K+1 subframe 423 in the unlicensed frequency band 402. For the example of FIG. 13 and FIG. 14, therefore, the eNB transmits the control information in the subframe (K) prior to the subframe where the data is transmitted by the UE device and the control information 1402 is transmitted in the licensed frequency band and the data is transmitted in the unlicensed frequency band.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   transmitting from communication equipment first signals within a licensed frequency band using a timing structure comprising frames, subframes and timeslots;
   transmitting from the communication equipment second signals within an unlicensed frequency band using the timing structure;
   monitoring the unlicensed frequency band;

determining, at least partially based on the monitoring, whether the unlicensed frequency band is in use; and transmitting, from the communication equipment, the second signals within the unlicensed frequency band only if the unlicensed frequency band is determined to not be in use, wherein a transmitting device transmits the second signals and the monitoring is performed by the transmitting device.

2. The method of claim 1, wherein the transmitting device is an enhanced Node B (eNB) providing wireless service within a service area.

3. The method of claim 2, further comprising:

transmitting, from the eNB, control information to a user equipment (UE) device, the control information identifying communication resources within the unlicensed frequency band used for transmitting the second signal from the eNB to the UE device.

4. The method of claim 3, wherein the transmitting, from the eNB, the control information comprises transmitting the control information within a subframe of the timing structure, and wherein the transmitting of the second signal comprises transmitting the second signal within the subframe.

5. The method of claim 3, wherein the transmitting, from the eNB, the control information comprises transmitting the control information within a first subframe of the timing structure, and wherein the transmitting of the second signal comprises transmitting the second signal within a second subframe subsequent to the first subframe.

6. The method of claim 1, wherein the transmitting device is a user equipment (UE) device within a service area of an enhanced Node B (eNB) providing wireless service within the service area.

7. The method of claim 6, further comprising:

transmitting, from the eNB, control information to the UE device, the control information identifying communication resources within the unlicensed frequency band used for transmitting the second signal from the UE device to the eNB.

8. The method of claim 7, wherein the transmitting, from the eNB, the control information comprises transmitting the control information within a first subframe of the timing structure, and wherein the transmitting of the second signal comprises transmitting the second signal within a second subframe subsequent to the first subframe.

9. The method of claim 7, further comprising:

transmitting, from the eNB, control information to the UE device, the control information identifying communication resources within the unlicensed frequency band used for transmitting the second signal from the eNB to the UE device.

10. The method of claim 9, wherein the transmitting, from the eNB, the control information comprises transmitting the control information within a subframe of the timing structure, and wherein the transmitting of the second signal comprises transmitting the second signal within the subframe, the method further comprising: buffering, at the UE device, data within the unlicensed frequency band.

11. The method of claim 9, wherein the transmitting, from the eNB, the control information comprises transmitting the control information within a first subframe of the timing structure, and wherein the transmitting of the second signal comprises transmitting the second signal within a second subframe subsequent to the first subframe.

12. The method of claim 1, wherein monitoring the unlicensed frequency band comprises monitoring the unlicensed frequency band for radio frequency energy.

13. The method of claim 12, wherein determining whether the unlicensed frequency band is in use comprises at least one of the following:

determining, based on the monitoring, that no energy is detected on the unlicensed frequency band; and determining, based on the monitoring, that energy detected on the unlicensed frequency band is below a threshold.

14. A transmitting device comprising:

a transmitter;

a receiver; and a controller, wherein the transmitter is configured to transmit first signals within a licensed frequency band using a timing structure comprising frames, subframes and timeslots, the transmitter is configured to transmit second signals within an unlicensed frequency band using the timing structure, the receiver is configured to monitor the unlicensed frequency band, the controller is configured to determine, at least partially based on the monitoring, whether the unlicensed frequency band is in use, and the transmitter is configured to transmit the second signals within the unlicensed frequency band only if the unlicensed frequency band is determined to not be in use.

15. A control apparatus configured to control a transmitting device, configured to:

transmit first signals within a licensed frequency band using a timing structure comprising frames, subframes and timeslots, transmit second signals within an unlicensed frequency band using the timing structure, monitor the unlicensed frequency band, determine, at least partially based on the monitoring, whether the unlicensed frequency band is in use, and transmit the second signals within the unlicensed frequency band only if the unlicensed frequency band is determined to not be in use.

* * * * *